Dec. 12, 1933.  A. B. EINIG  1,939,441
STOCK CONVEYING APPARATUS FOR METAL SAWING MACHINES
Filed June 18, 1932  5 Sheets-Sheet 1
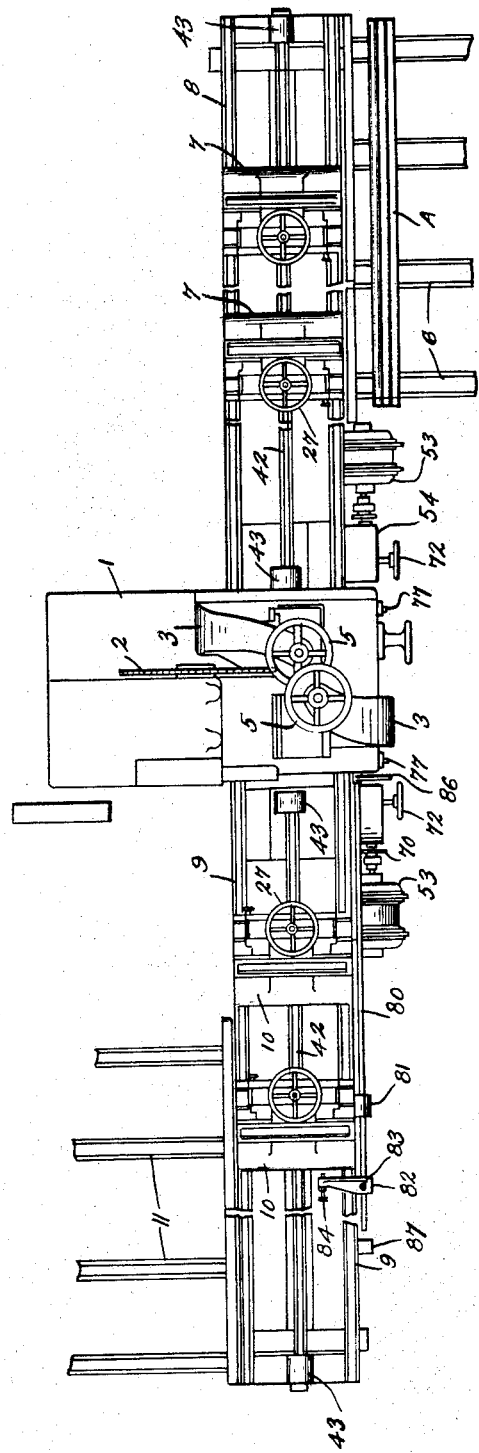
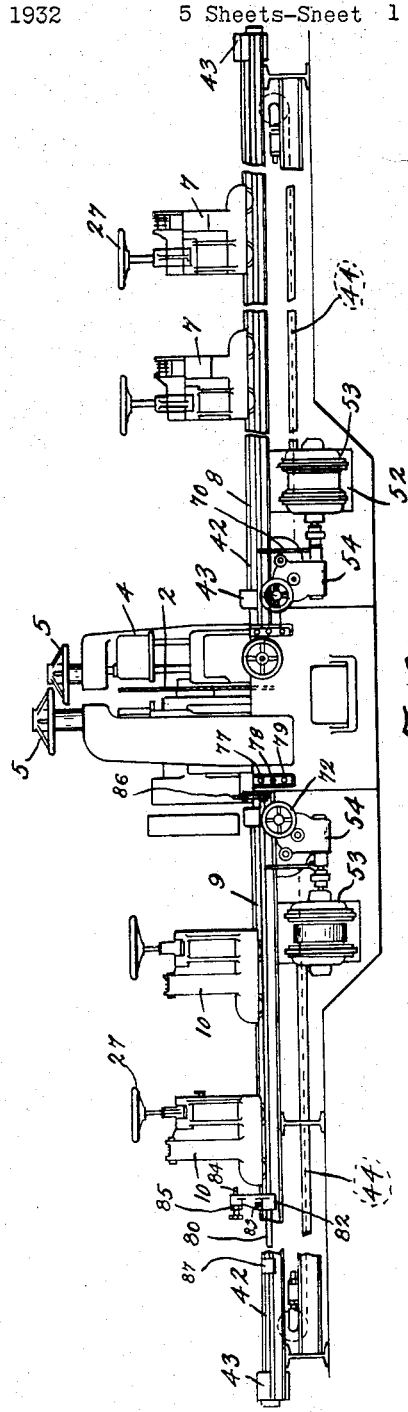
INVENTOR.
Alvin B. Einig
BY
Fay, Oberlin & Fay
ATTORNEYS Dec. 12, 1933.  A. B. EINIG  1,939,441
STOCK CONVEYING APPARATUS FOR METAL SAWING MACHINES
Filed June 18, 1932  5 Sheets-Sheet 2

INVENTOR.
Alvin B. Einig
BY
Fay, Oberlin & Fay
ATTORNEYS

Dec. 12, 1933.  A. B. EINIG  1,939,441
STOCK CONVEYING APPARATUS FOR METAL SAWING MACHINES
Filed June 18, 1932  5 Sheets-Sheet 3

INVENTOR.
Alvin B. Einig
BY
Pay Oberlin & Pay
ATTORNEYS

Dec. 12, 1933.  A. B. EINIG  1,939,441
STOCK CONVEYING APPARATUS FOR METAL SAWING MACHINES
Filed June 18, 1932  5 Sheets-Sheet 4

INVENTOR.
Alvin B. Einig
BY
Fay, Oberlin & Fay
ATTORNEYS.

Patented Dec. 12, 1933

1,939,441

UNITED STATES PATENT OFFICE 1,939,441

STOCK CONVEYING APPARATUS FOR METAL SAWING MACHINES

Alvin B. Einig, Cleveland Heights, Ohio, assignor to The Motch & Merryweather Machinery Company, Cleveland, Ohio, a corporation of Ohio Application June 18, 1932. Serial No. 617,985

7 Claims. (Cl. 29—69)

This invention relates, as indicated, to stock conveying apparatus for metal sawing machines, but has reference more specifically to apparatus of this character which is particularly adapted to facilitate the handling and cutting of bar stock or the like into sections of the desired length.

An object of the invention is to provide apparatus whereby the bars to be cut may be quickly and easily advanced to the metal sawing machine, and the severed sections of the bars removed from the machine.

Another object of the invention is to provide a novel movable carrier or bar conveyor in which the bars may be loaded without injury to the bars or carrier, and which is designed to carry a relatively large number of bars.

Another object of the invention is to provide a carrier of the character described having a vertically movable platform or bar support, which is operative to eject the last bars therefrom as the platform reaches the upper limit of its movement.

A further object of the invention is to provide an operation control system for the apparatus, including reversible motors and clutches operative to selectively move the carriers or their platforms.

A further object of the invention is to provide means for gauging the lengths of the bars which are to be cut from the stock.

A still further object of the invention is to provide apparatus of the character described embodying a minimum number of parts, which are of simple rugged construction. To the accomplishment of the foregoing and related ends, said invention, then, consists of the means hereinafter fully described and particularly pointed out in the claims.

The annexed drawings and the following description set forth in detail certain structure embodying the invention, such disclosed means constituting, however, but one of various structural forms in which the principle of the invention may be used.

Figure 3:
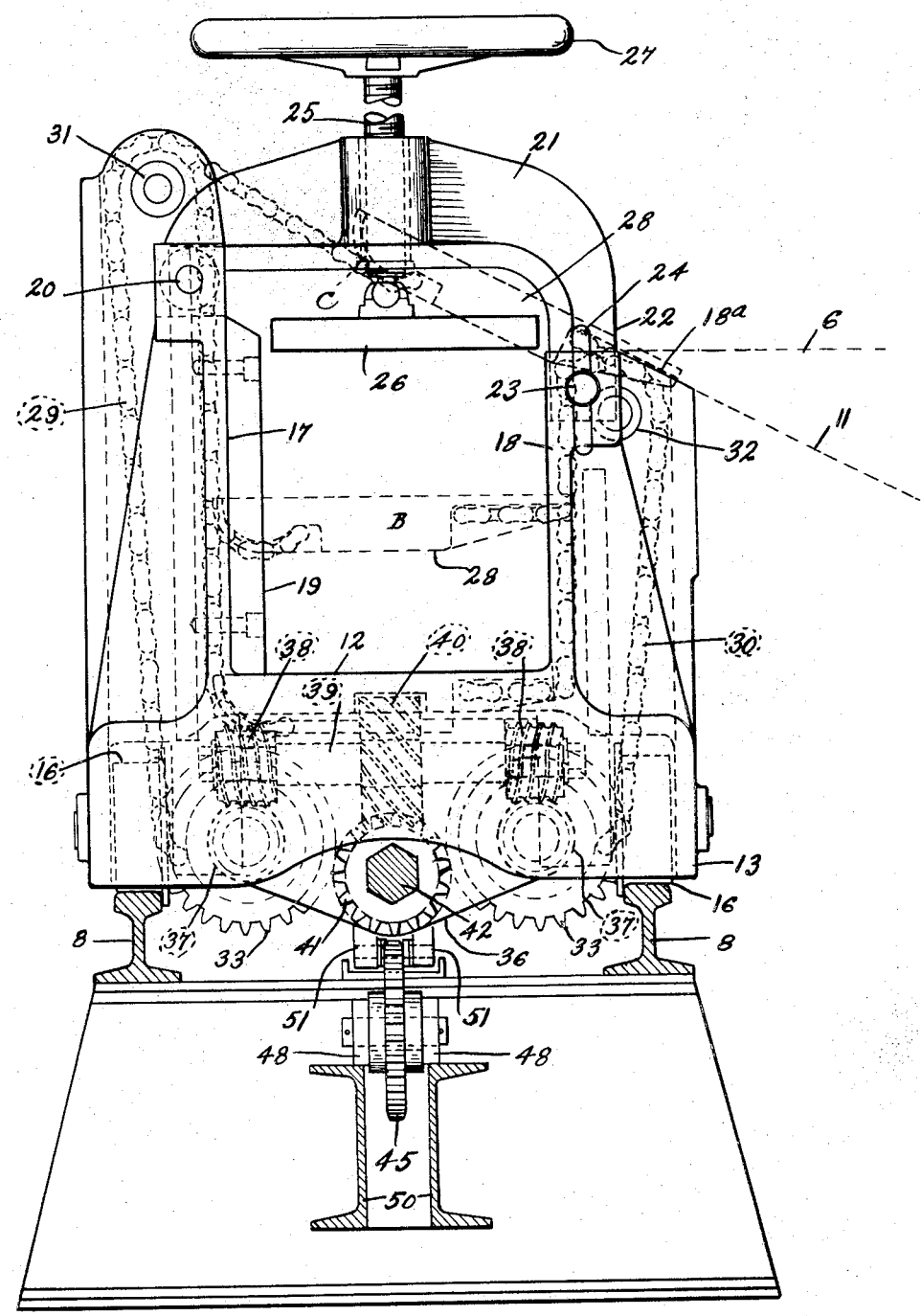
Figures 4, 5:
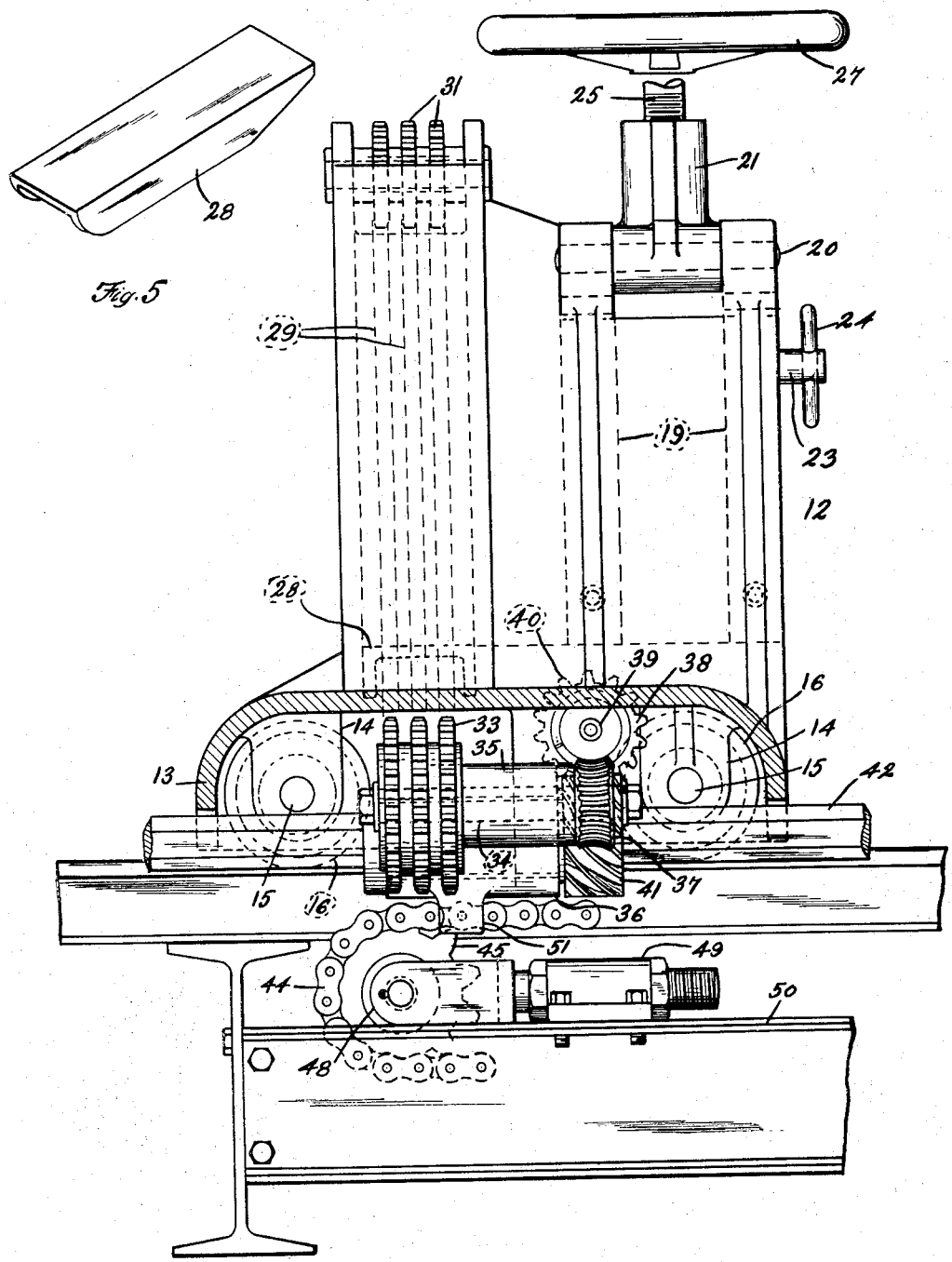
Figure 6:
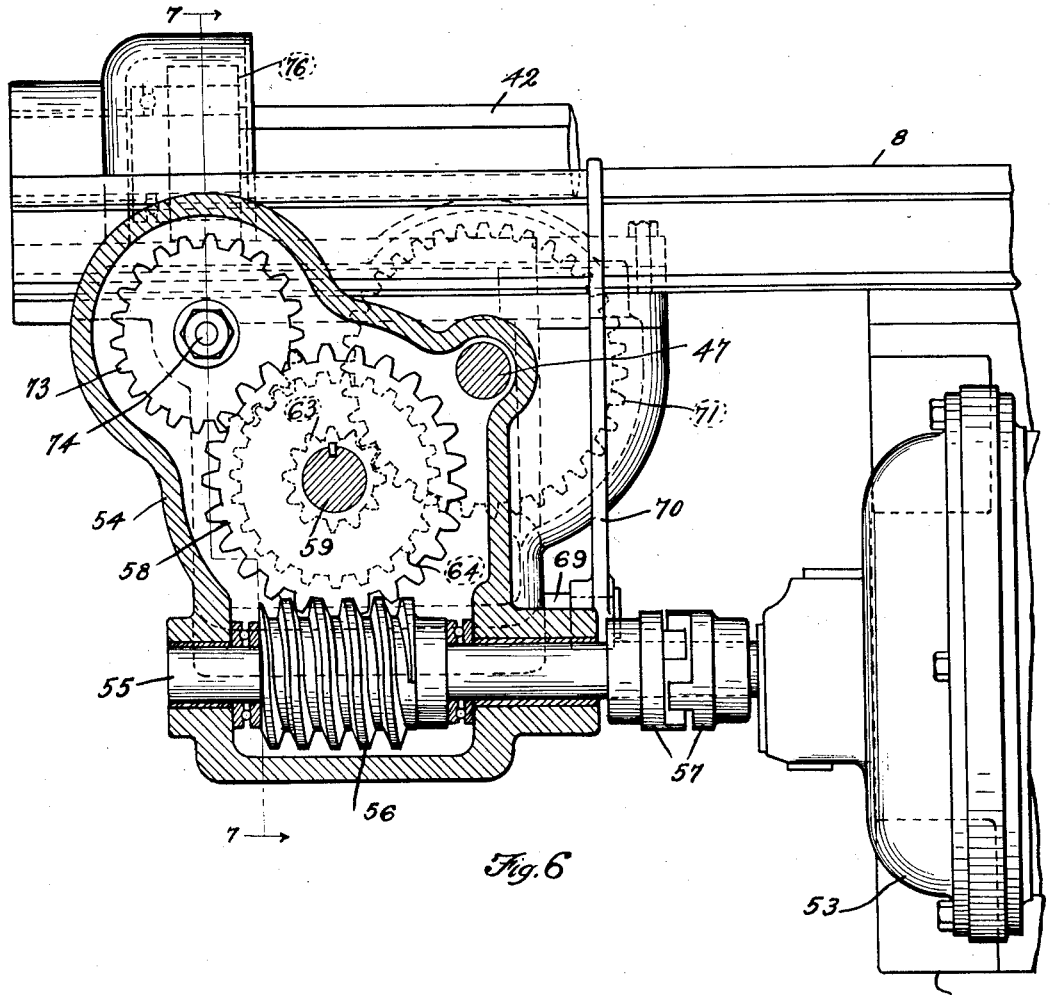
Figure 8:
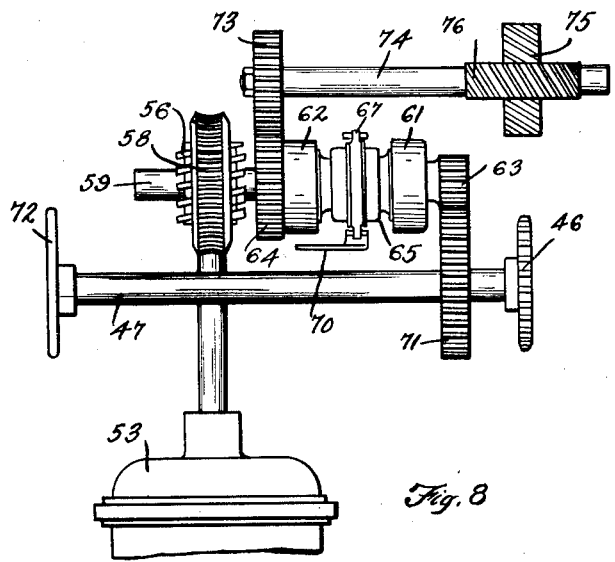
Figure 7:
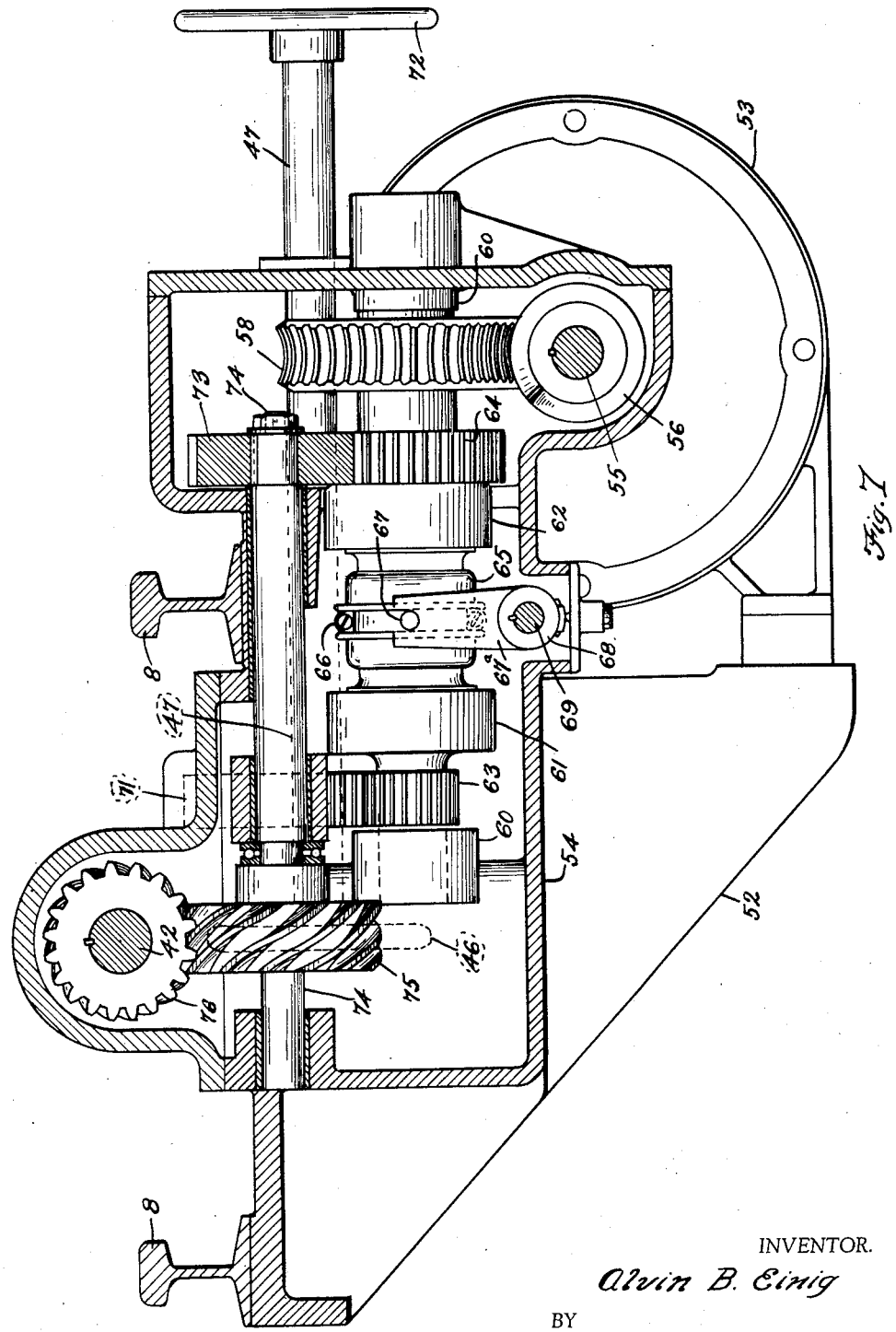

In said annexed drawings:

Fig. 1 is a plan view of the apparatus; Fig. 2 is a side elevation of the apparatus; Fig. 3 is a view, partly in elevation, and partly in section, of one of the bar carriers; Fig. 4 is a view, partly in side elevation and partly in section, of the bar carrier shown in Fig. 3; Fig. 5 is a perspective view of one of the bar elevating and lowering plates, which shall be hereinafter designated as a platform; Fig. 6 is a transverse cross-sectional view of one of the operating control mechanisms for the carriers; Fig. 7 is a cross sectional view through the control mechanism, taken on a plane, substantially indicated by the line 7—7 of Fig. 6; and Fig. 8 is a more or less diagrammatic plan view of the control mechanism shown in Figs. 6 and 7.

Referring to the drawings, wherein like reference numerals designate the same parts in the several views, 1 designates generally a metal sawing machine, which includes a power driven rotary saw 2 adapted to be moved to and from operating position to sever sections of the desired length from the bar stock. During the severing operation, the stock is temporarily clamped in stationary vises 3, which are located at the sides of the path of movement of the saw 2, and are provided with upper clamping members 4, adapted to be vertically moved to and from stock clamping position by means of handwheels 5.

The bars which are to be severed into sections of the desired length and which are designated A in Fig. 1, are discharged from a loading table 6 onto one or more trucks or carriers 7, which are movable on tracks 8 and are adapted to be advanced as desired to the metal sawing machine, whereby successive sections of the bars may be severed. At the opposite side of the metal sawing machine are tracks 9, upon which are mounted one or more trucks or carriers 10, which are similar in all respects to the trucks 7, but which for reasons which will later be apparent, are reversed with respect thereto. The carriers 10 normally occupy a position in which they are adapted to receive the projecting ends of the bars to be severed, and after each severing operation is completed, the trucks are moved along on the tracks 9 to a position in which the bar sections may be automatically discharged therefrom onto an unloading table 11.

The detailed construction of the carriers 7 and 10 is clearly shown in Figs. 3 and 4. Each carrier comprises a substantially U-shaped base or body 12 having a skirt portion 13 and depending bearings 14 spaced inwardly of the sides of the skirt portion. Short shafts 15 are journalled in the sides of the skirt portion 13 and bearings 14 and support wheels 16 movable along the tracks 8 or 9. The base 12 of the carrier is provided with vertically extending sides 17 and 18, the side 18 terminating at a point lower than the side 17 for a reason which will soon be apparent. Secured to the inner face of the side 17 of the carrier are longitudinally spaced replaceable guides 19 of cold-rolled steel or the like, which are adapted to take the impact and wear occasioned by the movement of the bars as they are being loaded into and unloaded from the carrier. Pivotally secured to the upper end of the side 17 of the carrier, as by a pin 20, is a yoke 21, the arm 22 of which is removably secured to upper end of the side 18 of the carrier by means of a pin 23 having a handle 24 secured thereto and passing through aligned apertures in the carrier and yoke arm. A screw 25 is threaded through the yoke and has secured to its lower end, as by a ball and socket joint, a clamp plate 26. Secured to the upper end of the screw 25 is a handwheel 27, whereby the clamp plate may be lowered into engagement with bars which have been loaded into the carrier to tightly clamp them in the carrier.

Upon removal of the pin 23, the yoke and its associated clamp plate may be swung upwardly and outwardly out of the path of the incoming or outgoing bars, when the carrier is being respectively loaded and unloaded.

In order to permit the bars which are loaded onto the carrier to be gently and gradually lowered therein, a vertically movable plate or platform 28 is provided, see Fig. 5. This platform is adapted to be moved by means of chains 29 and 30, which are respectively threaded about sprockets 31 and 32 journalled in the upper ends of the sides 17 and 18 of the carrier, are secured at one end to the bottom of the platform 28 and are secured at their opposite end to sprockets 33. The sprockets 33 are keyed to stub shafts 34 which are journalled in bearing portions 35 of a housing 36, which is secured to and depends from the base 12 of the carrier. Keyed to the opposite ends of these stub shafts 34 are worm gears 37, which are in mesh with worms 38 keyed to the ends of a shaft 39, which is suitably journalled in the housing 36. The shaft 39 has keyed thereto intermediate its ends a spiral gear 40, which is in mesh with a mating spiral gear 41, which is sleeved on a longitudinally extending shaft 42. The shaft 42 is journalled in bearings 43 mounted adjacent the ends of the rails 8, and is adapted to be rotated in either direction by mechanism which will be presently described.

Assuming that the carrier is loaded with bars, and that it is desired to unload these bars. This may be accomplished by swinging the yoke 21 upward out of the path of movement of the platform 28 and then rotating the shaft 42 in a direction to cause the sprockets 33, through the intermediary of the hereinbefore described gearing, to wrap up the chains 29 and 30. This wrap up of the chains causes the platform 28 to be elevated, carrying the bars upward. As the bars pass the upper end of the side 18 of the carrier, their weight causes them to move laterally, and they slide down the inclined surface 18a of the side of the carrier and onto the unloading table 11, which is indicated in dotted lines in Fig. 3. An intermediate position of the platform 28 during its upward movement is indicated by the dotted lines B in Fig. 3. When the upper surface of the platform 28 reaches a position approximately level with the upper edge of the side 18 of the carrier, the end thereof adjacent the side 18 is restrained by the chain 30 from moving higher, but the opposite end of the platform, owing to the higher position of the sprockets 31, is moved by the chain 29 to a position indicated by the dotted lines C in Fig. 3. By tilting the platform in this manner, a means is provided for positively discharging the last bars from the carrier, these bars sliding or rolling down the platform onto the unloading table 11.

In loading the carriers, the shaft 42 is rotated in a direction counter to that employed in unloading them. When the upper surface of the platform 28 is lowered to a position approximately level with or slightly below the upper edge of the side 18 of the carrier, the bars to be severed are then pushed of rolled off the loading table 6, which is indicated in dotted lines in Fig. 3, onto the platform. As the loading of the bars progresses, the platform is gradually lowered, and when the carrier is fully or partially loaded, the yoke 21 is swung back to its normal position and secured by means of the pin 23. The plate 26 may then be lowered into clamping engagement with the bars.

Suitable mechanisms for moving the carriers longitudinally along the tracks 8 or 9 are also provided. Since the carrier moving mechanisms for both the loading and unloading side of the apparatus are identical, it will be necessary to describe only one of these mechanisms.

This mechanism includes an endless chain 44, which is threaded about a sprocket 45, adjacent one end of the tracks 8 and about a sprocket 46 keyed to a shaft 47 adjacent the other end of the tracks 8. The sprocket 45 is journalled in a yoke bearing 48 which is longitudinally adjustable in a housing 49 secured to channel beams 50. By adjusting the yoke bearing 48, any slack in the chain 44 may be readily taken up. The housings 36, which are secured to the carriers, are provided with depending spaced ears or lugs 51, which are secured to links in the upper run of the chain 44, so that movement of the chain will result in moving the carriers along on their supporting tracks. It will be noted that since the spiral gear 41 is free to slide on the shaft 42, this shaft will not interfere with the longitudinal movement of the carriers.

Secured to the base of the rails 8, adjacent the inner ends thereof is a bracket 52, on which is mounted an electric motor 53. The motor 53 is adapted, through a suitable clutch mechanism, to selectively rotate the shaft 42 or drive the chain 44. The clutch mechanism and driving gears are enclosed within a housing 54, which is suitably secured to the base of the rails 8 adjacent the inner ends thereof. Journalled in suitable bearing portions of the housing 54 is a worm shaft 55, which has secured thereon a worm 56 and is adapted to be driven by the motor 53 through a coupling 57. The worm 56 is in mesh with a worm gear 58, which is keyed to and drives a shaft 59, which is journalled in bearing portions 60 of the housing. The shaft 59 has loosely mounted thereon female clutch members 61 and 62, clutch member 61 having secured thereto a gear 63 and clutch member 62, a gear 64. Keyed to, but slidable along the shaft 59, is a male clutch member 65 having a circumferential groove in which is loosely sleeved an adjustable collar 66 having pins 67 extending radially therefrom. These pins are adapted to be engaged by the bifurcated arms 67a of a yoke member 68, which is keyed to a rock shaft 69 journalled in the walls of the housing 54. Rigidly secured to this shaft 69 is an operating lever 70, by means of which the male clutch member 65 may be shifted into engagement with either of the female clutch members 61 and 62.

Gear 63 of clutch member 61 is in mesh with a larger gear 71, which is keyed to a shaft 47, which is suitably journalled in the walls of the housing 54 and is parallel with the shaft 59.

Keyed to the shaft 47 is a sprocket 46 about which the endless chain 44 is trained. When the lever 70 is operated to shift the clutch member 65 into engagement with the clutch member 61, the chain 44 will be driven and the carriers 7 moved as desired. Shaft 47 has a portion which projects out of the housing 49 and is provided with a hand wheel 72, whereby the carriers 7 may be manually moved to any desired position when the clutch member 65 is not in driving engagement with the clutch member 61.

Gear 64 of clutch member 62 is in mesh with a smaller gear 73, which is keyed to a shaft 74, which is suitably journalled in the walls of the housing 54 and is parallel with shafts 59 and 47. Keyed to the shaft 74 is a spiral gear 75 which is in mesh with a mating spiral gear 76 keyed to one of the circular extremities of the shaft 42. When the lever 70 is operated to shift the clutch member 65 into engagement with clutch member 62, the shaft 42 will be rotated, and the platforms 28 of the carriers 7 moved as desired.

The clutch member 65 is shown in the various figures as in neutral position, in which position no movement of the carriers or their platforms takes place.

The motors 53, which are employed to drive the carriers and their vertically movable platforms, are preferably of the reversing type. Each motor circuit is controlled by switches operated by buttons, 77, 78 and 79, which are mounted on panels secured, in an easily accessible position, on the base of the metal sawing machine 1. Buttons 77 cause the motors to rotate in a direction to impart a forward movement to the carriers and an upward movement to their platforms. Buttons 79 cause the motors to rotate in an opposite direction, whereby rearward movement may be imparted to the carriers and downward movement to their platforms. Buttons 78 cause the motors to stop.

On the delivery or unloading side of the sawing machine is a gage bar 80, which is mounted in suitable brackets 81 secured to one of the rails 9 and has a slight longitudinal movement in said brackets. A bracket 82 is slidably mounted on the bar 80 and is adjustable along the bar, being secured in adjusted position by means of a set screw 83. The bracket 82 is provided with a stop 84 in the form of a screw bolt, which may be adjusted transversely of the bracket and locked in adjusted position by means of a lock nut 85. The bracket 82 and stop 84 are normally disposed in the path of the moving stock, but may be moved transversely out of said path by means of a lever 86, which is rigidly secured to the gauge bar 80 adjacent its inner end.

A switch box 87 is mounted on the rail 9 adjacent the outer end of the gauge bar 80, and contains a switch (not shown), which is disposed in the path of the bar 80, and which, when opened cuts off the current supply to the motor 53 on the loading side of the metal sawing machine.

The operation and use of the apparatus may now be briefly described. By suitable manipulation of the motor controlling buttons and the clutch operating lever, the carriers 7 are moved to a position adjacent the loading table 6, where they are loaded with bars in the hereinbefore described manner. The loaded carriers are then moved towards the sawing machine, and the portions of the bars to be cut off are passed through the open stationary vises 3 and the carriers 10, which are also open and in position to receive such portions of the bars.

The stop 84 having been previously set to determine the length of the bars to be cut off, is abutted by one of the bars, whereupon the gauge bar 80 is moved longitudinally a slight distance and opens the switch in the box 87, thereby cutting off the current supply to the motor 53 on the loading side of the metal sawing machine. When the current to said motor is thus cut off, the motor slows down and the bars continue to move a short distance, stopping at a point short of their final position. The bars are moved to their final position, which is determined by a positive stop (not shown), by means of the hand-wheel 72 which moves the carriers 10 and the bars resting thereon. Manual movement of the bars to their final position insures that the length of the bars to be cut off will be uniform.

When the bars reach their final position, they are clamped in the stationary vises 3, and the projecting portions of the bars are severed. The severed portions of the bars are successively carried away by the carriers 10 to a position adjacent the unloading table 11, where the bars are unloaded as previously described.

A particular advantage of the present apparatus resides in the accessibility of the various controls, and the consequent operation of the apparatus with a minimum number of workers. It will also be noted that the carriers are so constructed and operated that they may be loaded to a relatively high capacity, and that the bars during loading are handled in such a manner that they do not fall into the carriers by gravity, thereby possibly causing injury to the bars as well as the carriers.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, comprising means for severing sections from bars or the like and a track; a carrier movable on the track and adapted to receive the portions to be severed from the bars, means for moving the truck to and from bar receiving position, a platform on the carrier, means for elevating said platform to a predetermined level without tilting the platform and thereafter tilting the platform to effect discharge of the severed sections from the carrier, and single clutch means operable to selectively move the carrier on the track or impart movement to the platform elevating means.

2. In apparatus of the character described, comprising means for severing sections from bars or the like and a track; a carrier movable on the track and adapted to receive the portions to be severed from the bars, means for moving the truck to and from bar receiving position, a platform on the carrier, means for elevating said platform to a predetermined level without tilting the platform and thereafter tilting the platform to effect discharge of the severed sections from the carrier, and a two-way clutch operable to selectively move the carrier along the track or impart movement to the platform elevating means.

3. In apparatus of the character described, a carrier comprising a substantially U-shaped body portion having a horizontal base, a platform movable vertically with respect to the base of said body portion, sprockets mounted on the arms of said body portion, a housing depending from and secured to the base of said body portion, sprockets mounted on said housing, chains extending around said first-named sprockets having one end thereof secured to said platform and the other end to said last-named sprockets, and a common drive for said last-named sprockets.

4. In apparatus of the character described, a carrier comprising a substantially U-shaped body portion having a horizontal base, a platform movable vertically with respect to the base of said body portion, sprockets mounted on the arms of said body portion, a housing depending from and secured to the base of said body portion, sprockets mounted on said housing, and chains extending around said first-named sprockets and having one end thereof secured to said platform and the other end to said last-named sprockets, and common means for driving said last-named sprockets in opposite directions to wrap up the chains and elevate said platform.

5. In apparatus of the character described, a carrier comprising a substantially U-shaped body portion having a horizontal base, a platform movable vertically with respect to the base of said body portion, sprockets mounted on the arms of said body portion, a housing depending from and secured to the base of said body portion, sprockets mounted on said housing, chains extending around said first-named sprockets having one end thereof secured to said platform and the other end to said last-named sprockets, and means for simultaneously driving said last-named sprockets, said means comprising a driven shaft journalled in said housing, worms secured to the ends of said shaft and worm gears in mesh with said worms.

6. In apparatus of the character described, a carrier comprising a substantially U-shaped body portion having a horizontal base, a platform movable vertically with respect to the base of said body portion, sprockets mounted on the arms of said body portion, a housing depending from and secured to the base of said body portion, shafts journalled in said housing having sprockets at one end thereof and worm gears at the other ends thereof, chains extending around said first-named sprockets and having one end thereof secured to said platform and the other end to said last-named sprockets, and means for simultaneously driving said last-named sprockets in opposite directions, said means comprising a driven shaft journalled in said housing and worms secured to the ends of said shaft and in mesh with said worm gears.

7. In apparatus of the character described, a U-shaped carrier, one of the arms of which terminates at a point higher than the other arm, a platform mounted for vertical movement between said arms and means for imparting such movement to said platform, said means comprising sprockets journalled in the upper ends of said arms, a housing mounted beneath said carrier, stub shafts journalled in said housing having sprockets at one end thereof and worm gears at the other end thereof, chains extending around said first-named sprockets and having one end thereof secured to said platform and the other end to said last-named sprockets, a driven shaft journalled in said housing and worms secured to the ends of said shaft and in mesh with said worm gears.

ALVIN B. EINIG.